Jan. 9, 1968

R. D. BECK ETAL 3,362,427

LIQUID LEVEL CONTROL SYSTEM

Filed Feb. 12, 1965

INVENTORS
ROLAND D. BECK
REED A. PALMER

BY *Caudr & Caudr*

THEIR ATTORNEYS

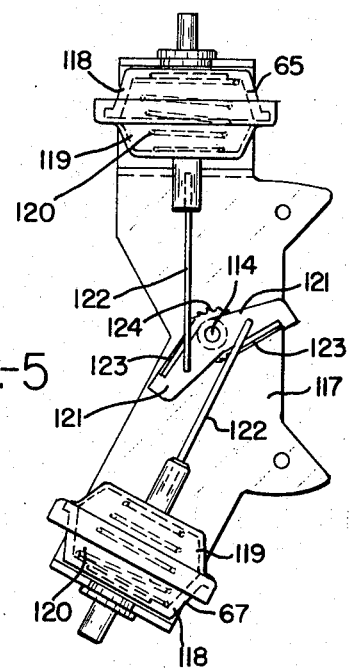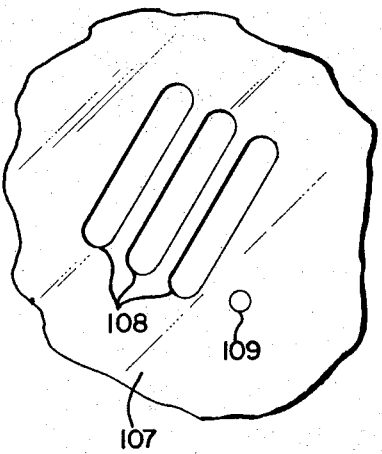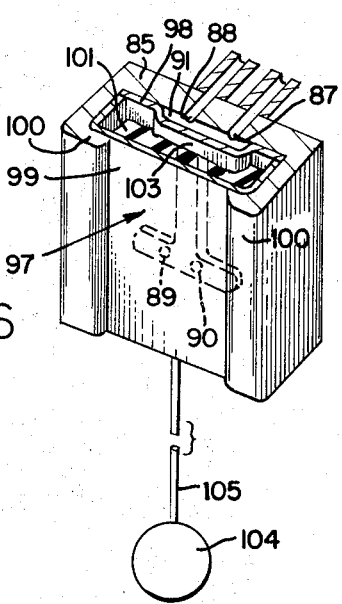

United States Patent Office 3,362,427
Patented Jan. 9, 1968

3,362,427
LIQUID LEVEL CONTROL SYSTEM
Roland D. Beck, Anaheim, and Reed A. Palmer, Los Alamitos, Calif., assignors to Robertshaw Controls Company, Richmond, Va., a corporation of Delaware
Filed Feb. 12, 1965, Ser. No. 432,300
12 Claims. (Cl. 137—387)

ABSTRACT OF THE DISCLOSURE

This disclosure relates to a control system for a washing machine or the like wherein means are provided for preventing the water level therein from exceeding a desired level, the system including a device which when advance a movable program member to a position where the program member will cause operation of a drain means to remove the water from the apparatus and will maintain the program member in its drain operating position until after the sensing device is manually overridden.

---

This invention relates to an improved control system for a domestic appliance or the like for controlling such appliance or the like.

In particular, it has been found that in domestic appliances and the like wherein water is directed therein to a predetermined level by water directing means, failure of the control system during the operation of the water filling means would cause the water level to rise in the apparatus above a desired safe level and thereby cause certain damage to the apparatus as well as other complications.

According to the teachings of this invention, improved means are provided for sensing a water overfill condition of an apparatus or the like whereby the sensing device causes the apparatus to remove the water therefrom while preventing further operation of the apparatus until the sensing device is manually overriden.

Accordingly, it is an object of this invention to provide an improved control system for an apparatus or the like having one or more of the novel features of this invention as shown or described.

Other objects, uses and advantages of this invention are apparent from a reading of this description which proceeds with reference to the accompanying drawings forming a part thereof and wherein:

FIGURE 4 is an enlarged, fragmentary, plan view of the program member of FIGURE 3.

FIGURE 5 is a broken-away fragmentary view taken on line 5—5 of FIGURE 3 to illustrate the program member advancing means.

FIGURE 6 is an enlarged, fragmentary, perspective view of the overfill safety device of this invention.

Figure 1:
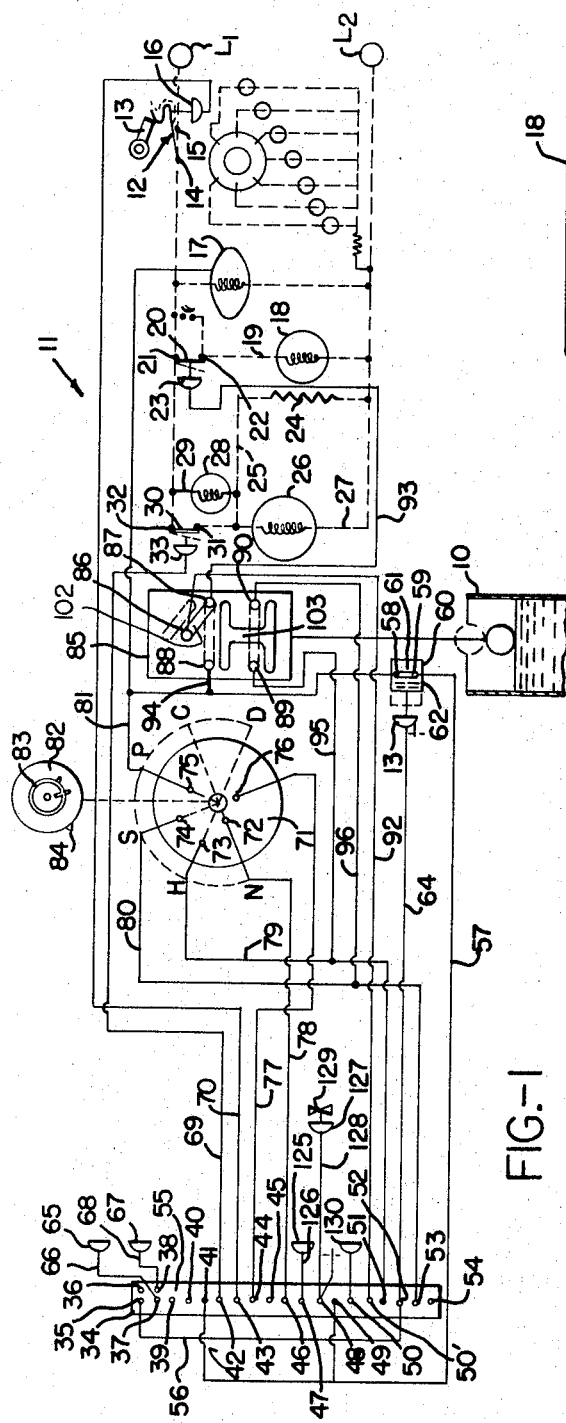
FIGURE 1 is a schematic view illustrating the improved control system of this invention.

While the various features of this invention are hereinafter described and illustrated as being particularly adaptable for providing a control system for a domestic dishwasher or the like, it is to be understood that the various features of this invention can be utilized for other apparatus as desired.

Therefore, this invention is not to be limited to only the embodiment illustrated in the drawings, because the drawings are merely utilized to illustrate one of the wide variety of uses of this invention.

Referring now to FIGURE 1, an improved control system for a domestic dishwasher, schematically shown and indicated by reference numeral 10, is generally indicated by the reference numeral 11 and is adapted to control various operating parts of the dishwasher 10 in a timed sequence as set forth in FIGURE 2 and as hereinafter described.

The system 11 includes electrical leads $L^1$ and $L^2$ for plugging into an electrical poser source, the lead $L^1$ having a normally open switch blade 12 therein which is adapted to be closed when the dishwasher door handle 13 is rotated in a clockwise direction to close the switch blade 12 across contacts 14 and 15. In addition, a vacuum actuator 16 is interconnected to the actuator and when the chamber thereof is evacuated, the same is adapted to hold the switch blade 12 across the contacts 14 and 15 regardless of whether the handle 13 is in the position illustrated in FIGURE 1 or not for a purpose hereinafter described.

A vacuum pump 17 is disposed across the leads $L^1$ and $L^2$. Similarly, a timer motor 18 is disposed across the leads $L^1$ and $L^2$ by a lead 19, the lead 19 having a normally closed switch blade 20 therein bridging contacts 21 and 22.

The switch blade 20 is interconnected to a vacuum actuator 23 which when interconnected to the pump 17 in the manner hereinafter described will move the switch blade 20 out of bridging contact with the contacts 21 and 22 to turn off the timer motor 18.

A heater 24 for the dishwasher 10 is placed across the leads $L^1$ and $L^2$ by a head 25. In addition, an electric motor 26 for driving the impeller of the dishwasher 10 is placed across the leads $L^1$ and $L^2$ by a lead 27. A drain pump 28 is placed across the leads $L^1$ and 25 by a lead 29.

A switch blade 30 is disposed in the lead 27 and is normally disposed in a closed position to bridge contacts 31 and 32. Thus, as long as the switch blade 30 is disposed in its closed position across the contacts 31 and 32, the drain pump 28 is not operating and the impeller 26 will be operating. Conversely, when the switch blade 30 is moved to an open position, the impeller motor 26 ceases to operate and the drain pump 28 begins to operate.

A vacuum actuator 33 is operatively interconnected to the switch blade 30 so that when the chamber of the actuator 33 is interconnected to the atmosphere, the switch blade 30 is disposed across the contacts 31 and 32 and when the chamber of the actuator 33 is interconnected to the vacuum pump 17 in a manner hereinafter described, the switch blade 30 is moved to its open position.

A stationary reading head 34 is provided with ports 35, 36, 37, 38, 39, 40, 41, 42, 43, 44, 45, 46, 47, 48, 49, 50, 50′, 51, 52, 53, and 54 interrupting the reading surface 55 thereof.

The ports 35, 36, 45, and 52 are all interconnected together by a flexible conduit means 56.

The vacuum pump 17 has the inlet side thereof interconnected to the ports 41 and 49 by a flexible conduit means 57, the conduit means 57 has two ports 58 and 59 formed in a reading head 60 and adapted to be bridged by an opened blister 61 in a flexible tape-like member 62 normally disposed in the position illustrated in FIGURE 1. However, a vacuum actuator 63 is provided and interconnected to the tape valve 62 so that when the actuator 63 is evacuated, the same pulls the tape valve 62 to the dotted line position whereby the ports 58 and 59 are out of communication therewith and the vacuum pump 17 will not be interconnected to the ports 41 and 49 of the reading head 34, the chamber of the actuator 63 being interconnected to the port 52 of the reading head 34 by a flexible conduit means 64.

The port 37 of the reading head 34 is interconnected to a vacuum actuator 65 by a conduit means 66. Similarly, the port 38 of the reading head 34 is interconnected to a vacuum actuator 67 by a conduit means 68.

The port 42 of the reading head 34 is interconnected to the actuator 33 by a conduit means 69. The port 43 of the reading head 34 is interconnected to the actuator 16 by a flexible conduit means 70.

A second reading head 71 is provided and has ports 72, 73, 74, 75 and 76 interrupting the same.

The port 44 of the reading head 34 is interconnected to the port 76 of the reading head 71 by conduit means 77. The port 46 of the reading head 34 is interconnected to the port 72 of the reading head 71 by conduit means 78. The port 51 of the reading head 34 is interconnected to the port 73 by conduit means 79. The port 53 of the reading head 34 is interconnected to the port 74 of the reading head 71 by conduit means 80. The port 75 of the reading head 71 is interconnected to the vacuum pump inlet conduit means 57 by a branch conduit means 81.

A selector valve 82 is provided to cooperate with the reading head 71, the selector valve 82 having raised blister means 83 provided therein to interconnect up certain of the ports of the reading head 71 together depending upon position of an indicator 84 of the selector valve 82.

For example, when the indicator 84 of the selector valve 82 is at the position N in FIGURE 1, the same operates the dishwasher for a normal cycle. When the indicator 84 is at the position H the same operates the dishwasher for a heavy load wherein the entire cycle of operation shown in FIGURE 2 is accomplished.

When the indicator 84 is in the position S, a short dishwasher cycle is provided.

When the indicator 84 is in the position P, a prewash operation is effected.

When the selector valve 82 is in the C position, the same provides a cancelling of the washing machine operation regardless of the particular period of cycle therein.

When the indicator 84 is in the position D, the same provides merely a drying operation for the dishwasher 10.

A third stationary reading head 85 is provided in FIGURES 1 and 6 and has ports 86, 87, 88, 89 and 90 interrupting the reading surface 91 thereof.

The port 86 of the reading head 85 is interconnected to the port 50' of the reading head 34 by a flexible conduit means 92. The port 87 of the reading head 85 is interconnected to the vaccum actuator 23 by a flexible conduit 93. The port 88 of the reading head 85 is interconnected to the conduit 57 leading from the vacuum pump 17 by a flexible conduit 94. The port 89 is interconnected to the flexible conduit 79 by a branch conduit means 95. The port 90 in the reading head 85 is interconnected to the conduit 80 by a conduit means 96.

A movable valve means 97, FIGURE 6, cooperates with the reading head 85 and comprises a flexible tape-like member 98 interconnected to a rigid backing member 99 guided for vertical movement relative to the reading head 85 by flanges 100 of the reading head 85. A porous resilient material 101 is disposed between the backing member 99 and the tape member 98 to compress the tape member 98 into sealing and sliding relation with the reading surface 91 of the reading head 85.

The tape member 98 has a raised angularly disposed blister 102, FIGURE 1, which is only adapted to bridge the ports 86 and 87 in the reading head 85 when the valve member 97 does not sense a water overfill condition for the dishwasher 10.

In addition, the tape member 98 includes an I-shaped raised blister 103 adapted to simultaneously bridge the ports 88, 87 and 89, 90 when the valve member 97 is moved upwardly by sensing a water overfill condition in the dishwasher 10.

In particular, the valve member 97 is interconnected to a float member 104 by an interconnecting means 105 so that when a water overfill condition in the dishwasher 10 occurs, the float 104 is moved upwardly such a distance to cause the member 97 to move the blister 102 away from the ports 86 and 87 while moving the I-shaped blister 103 in a manner to bridge the ports 88, 87 and 89, 90 for a purpose hereinafter described.

Figure 3:
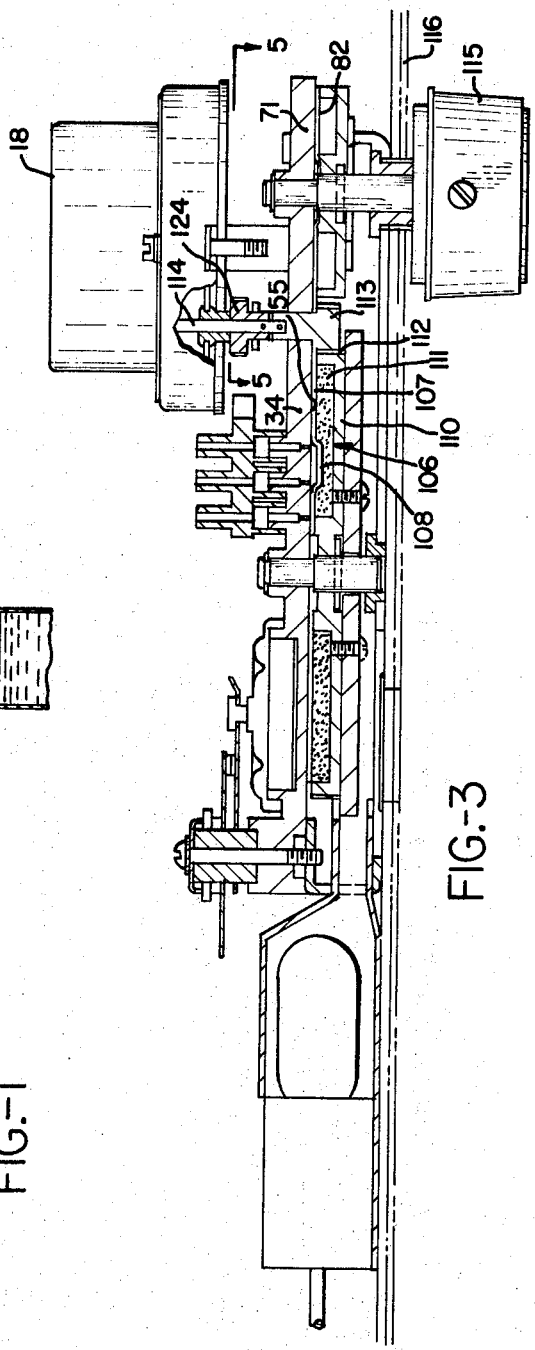
FIGURE 3 is a fragmentary cross-sectional view of the program means of this invention.

The reading head 34 previously described is illustrated in FIGURE 3 and has a program member 106 sequentially interconnecting various ports thereof together in a manner hereinafter described. The program member 106 includes a disc-shaped flexible member 107 having a plurality of raised blisters 108 and apertures 109, FIGURE 4, formed therein in an appropriate pattern to be respectively aligned with various ports in the reading head 34.

A rigid backing member 110 is operatively interconnected to the flexible member 107 and compresses a porous resilient material 111 therebetween, the backing member 110 having a ring gear effect 112 at the outer peripheral edge thereof disposed in meshing relation with a pinion gear 113 rotatably mounted in the reading head 34 and driven by a shaft means 114 of the timer motor 18 previously described. However, the shaft means 114 of the timer motor 18 is interconnected to the driving mechanism thereof by a one way clutch so that the pinion gear 113 can be moved independently of the motor means 18 for a purpose hereinafter described.

The reading head 34 also integrally includes the reading head 71 previously described with the tape valve 82 being cooperable therewith and selectively rotated by a control knob 115 being exposed at the front of an indicator panel 116.

The pneumatic motors 65 and 67 previously described are mounted on a plate member 117, FIGURE 5, carried by the reading head 34 and each comprises a cup-shaped rigid housing 118 carrying a flexible diaphragm 119 normally urged in its out position as illustrated in FIGURE 5 by a compression spring means 120.

A pair of ratchet members 121 are respectively rotatably disposed about the means 114 and are interconnected to the flexible diaphragms 119 of the actuators 65 and 67 by linkage means 122. Each ratchet member 121 has a finger 123 directed toward a pinion gear 124 fixed to the shaft means 114 so that when one of the actuators 65 or 67 is evacuated and the diaphragm 119 thereof is pulled away from the shaft means 114, the respective finger 123 thereof meshes with the pinion gear 124 to rotate the same whereby the pinion gear 113 is rotated in unison therewith to advance the program member 106 in an overriding manner over the control of the motor 18.

The blisters 108 on the program member 106 are so constructed and arranged that the same always sequentially bridge the ports 35, 37 and 36, 38 while alternately an aperture 109 is aligned with either the port 37 or the port 38 whereby when the vacuum pump 17, in the manner hereinafter described, is interconnected to the conduit means 56, one of the actuators 65 or 67 is evacuated while the other actuator 65 or 67 is interconnected to the atmosphere by an aperture means 109 so that the steppers 65 and 67 are alternately evacuated to advance the program member 106 in a continuous manner until the vacuum to the actuators 65 and 67 is terminated whereby the actuators 66 and 67 can rapidly advance the program member 106 independently of the motor 18 for a purpose hereinafter described.

The port 47 in the reading head 34 is interconnected to a vacuum actuator 125 by a flexible conduit means 126, the actuator 125 when actuated dispensing a wetting agent in the dishwasher 10.

The port 48 in the reading head 34 is interconnected to a vacuum operated actuator 127 by a flexible conduit means 128, the actuator 127 when actuated opening a water control valve 129 which directs water into the dishwasher 10.

The port 50 in the reading head 34 is interconnected to a vacuum operated actuator 130 by a conduit means 131, the actuator 130 when actuating dispensing a detergent inot the dishwasher 10.

The operation of the control system 11 of this invention will now be described.

Assuming that the operator moves the selector knob 115 to select a program for heavy wash, the pointer 84 of the tape 82 is disposed adjacent the H position thereof in FIGURE 1 whereby the blister 83 of the tape 82 does not interconnect the vacuum port 75 thereof with any of the ports 72, 73, 74 and 76 thereof.

The operator then closes the lid of the dishwasher 10 and turns the handle 13 to the position illustrated in FIGURE 1 whereby the switch blade 12 bridges the contacts 14 and 15 to place the vacuum pump 17 and timer motor 18 across the leads $L^1$ and $L^2$.

Figure 2:
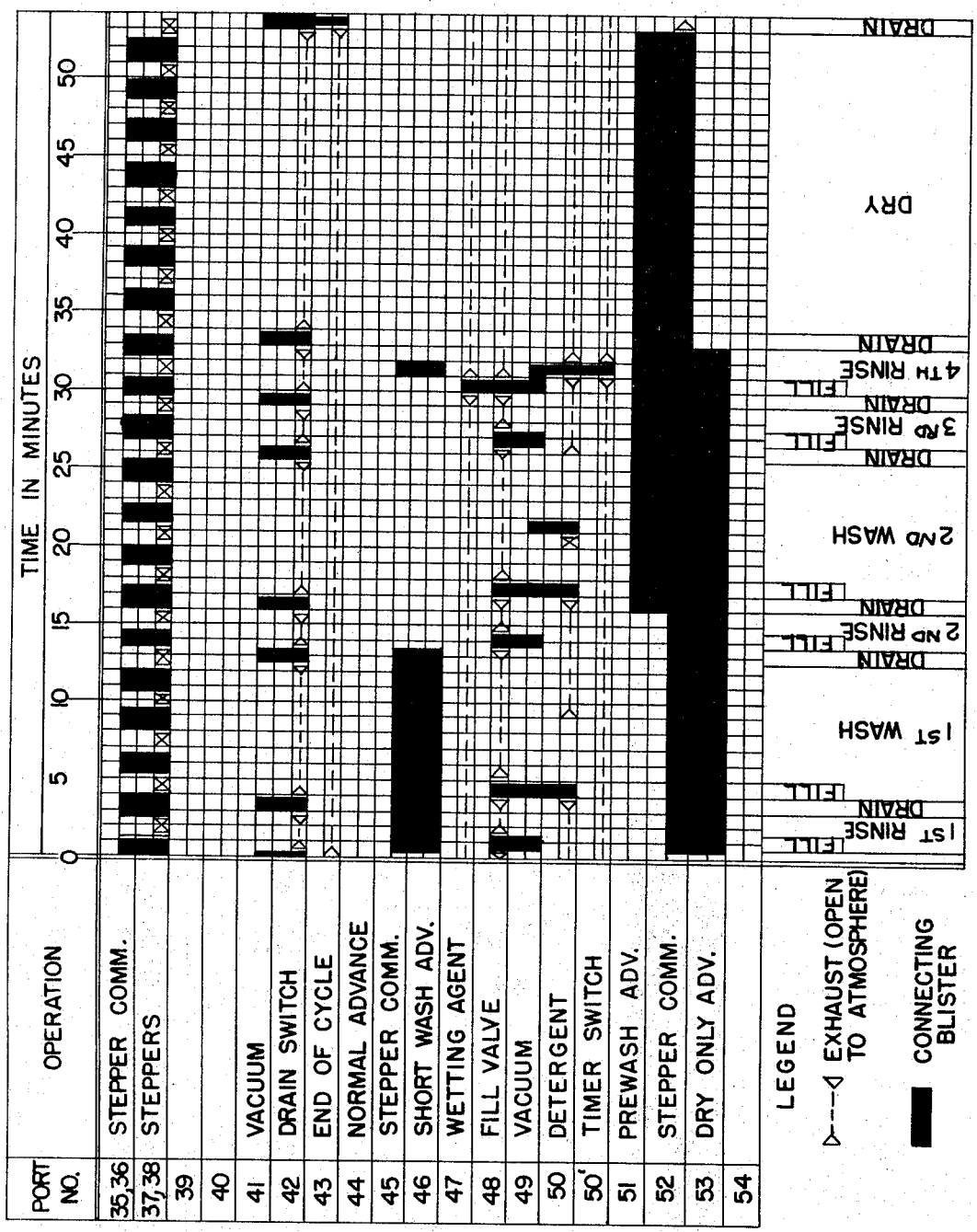
FIGURE 2 is an operation chart disclosing the sequence of operation for the system illustrated in FIGURE 1.

As illustrated in FIGURE 2, when the dishwasher is first turned on in the above manner, a blister means 108 of the program tape 107 bridges the ports 41 and 42 to interconnect the vacuum source 17 to the actuator 33 to open the switch blade 30 so that the drain pump 28 will operate for a fraction of a minute to drain any residual water in the dishwasher 10.

Also, it can be seen in FIGURE 2 that blisters and aperture means alternately pass over the ports 35, 37 and 36, 38 in a manner to tend to operate the actuators 65 and 67. However, no vacuum is interconnected to the conduit means 56 to operate the actuators 65 and 67 even though blister means are bridging the ports 52 and 53 as the flexible conduit means 80 leads to a closed port 74 and the branch conduit means 96 leads to a closed port 90 in the reading head 85.

After the initial drain operation, an aperture means 109 is aligned with the port 42 in the reading head 34 to return the actuator 23 to its atmospheric condition to close the switch blade 50 and terminate the operation of the drain pump 28 while placing the impeller motor 29 across the leads $L^1$ and $L^2$. At this time blister means 108 bridges the ports 45 and 46 which would actuate the actuators 65 and 67 if a short wash cycle were selected by the selector knob 115. However, since the port 46 of the reading head 34 is interconnected to port 72 of the selector reading head 71 by the conduit means 78 and the vacuum port 75 thereof is not connected to the port 72 by the blister means 83, the actuators 65 and 67 are not actuated.

At the same time, blister means 108 bridge the ports 48 and 39 of the reading head 34 whereby the vacuum in the conduit means 37 leading to the port 49 is interconnected to the port 48 leading to the actuator 127 to operate the valve 129 to direct water into the dishwasher 10 for a first rinse operation.

Therefore, it can be seen that by following the sequence in timed relation as illustrated in FIGURE 2, various ports are interconnected by blister means 108 as represented by the solid boxes therein while other ports are interconnected to atmosphere by aperture means 109 as represented by the facing triangles interconnected together by dashed lines. Thus, the operation of the dishwasher 10 is operated in a normal manner by the program means 106 until the fifty-four minute interval is reached whereby ports 41 and 42 are bridged by blister means 108 of the program means 106 to interconnect the vacuum pump 17 to the drain actuator 23 to again operate the drain pump 28. At the fifty-four and one half minute interval the blister means 108 also bridge the ports 41, 42 and 43 so as to interconnect the vacuum pump 17 to the end of cycle actuator 16 to pull downwardly on the switch blade 12 and permit the handle 13 to move out of actuating position by spring means or the like. Thereafter, the program member advances an aperture means 109 to cover the port 43 to permit atmosphere to return to the end of cycle actuator 16 so that the switch blade 12 can be moved upwardly to unbridge the contacts 14 and 15 and turn off the control system 11.

During the water filling operations as represented by the first rinse, first wash, second rinse, second wash, third rinse and fourth rinse in FIGURE 2, the overfill safety device 85 has its valve means 97 disposed in the position illustrated in FIGURE 1 whereby the actuators 65 and 67 are not actuated.

However, if during any of the water filling operations, the water valve 129 would stick in its open position or the timer motor 18 should fail when the same has caused actuation of the actuator 127, it can be seen that water would be directed into the dishwasher 10 and rise to an unsafe level whereby the overfill condition would adversely affect the dishwasher 10 as well as flood the surrounding area.

The float 104, however, will sense the water overfill condition in the dishwasher 10 and rise with the water level thereof to move the valve member 97 upwardly to cause the blister means 102 to move away from the ports 86 and 87 thereof while causing the I-shaped blister 103 to bridge the ports 88, 87 and 89, 90.

Since the ports 88, 87 and 89, 90 are all bridged by the I-shaped bister 103 of the valve member 97 when an overfill condition exists, it can be seen that the vacuum pump 17 is interconnected to the port 88 and, thus, to the ports 87, 89 and 90 whereby the vacuum pump 17 is now interconnected to the ports 51 and 53 of the reading head 34. Since during any part of the cycle of the dishwasher 10, the ports 52 and 53 of the reading head 34 are bridged by blister means 108, the actuators 65 and 67 are actuated in a rapid manner to move the program member 106 to the fifty-four minute interval thereof as illustrated in FIGURE 2 whereby at this position the ports 41 and 42 are interconnected together to cause operation of the drain pump 28. Further advancement of the program member 106 by the actuators 65 and 67 is terminated at this position as the blister means 108 for the actuators 65 and 67 are discontinued. In order to hold the programmer 106 in its fifty-four minute interval position whereby the drain pump 29 will continue to operate, the port 87 of the device 85 is interconnected to the actuator 23 whereby the vacuum pump 17 is interconnected to the actuator 23 and causes the switch blade 20 to move away from bridging the contacts 21 and 22 whereby the timer motor 18 is turned off so that the timer motor 18 cannot further advance the program member to cause actuation of the end of cycle actuator 16.

Thus, when a water overfill condition is sensed by the device 85, the program member 106, regardless of the position thereof, is rapidly advanced by the actuators 65 and 67 to its final drain position and is held in that final drain position as the timer motor 18 is turned off.

Even though the water level in the dishwasher 10 should subsequently fall below the unsafe overfill condition thereof, the valve member 97 will not move downwardly because the blister 103 causes the vacuum pump 17 to apply a vacuum over a large area of the valve means 97 whereby the vacuum will hold the valve means 97 in its raised position.

Therefore, the drain pump 28 continues to operate after an overfill water condition has been sensed by the device 85 and will only be terminated when the operator pulls the appliance plug or opens the lid of the dishwasher 10.

Accordingly, it can be seen that this invention provides an improved control system for an apparatus to eliminate a water overfill condition.

While the form of the invention now preferred has been disclosed as required by the statutes, other forms may be used, all coming within the scope of the claims which follow.

What is claimed is:

1. An apparatus having means for directing water therein to fill the same to a desired level and having means for draining the apparatus of the water at a desired time, a movable program member for causing sequential operation of said water directing means and said draining means, and a water level sensing device, said device when sensing a water overfill condition advancing said program member to a position to cause operation of said draining means to tend to remove the water from said apparatus.

2. An apparatus as set forth in claim 1 wherein said device continues to hold said program member in its drain operating position even after said water level has fallen below said overfill condition.

3. An apparatus as set forth in claim 1 wherein said device continues to hold said program member in its drain operating position until said device is manually overridden.

4. An apparatus having means for directing water therein to fill the same to a desired level and having means for draining the apparatus of the water at a desired time, a movable program member for causing sequential operation of said water directing means and said draining means, a timer means for moving said program member and a water level sensing device, said device when sensing a water overfill condition advancing said program member to a position to cause operation of said draining means to tend to remove the water from said apparatus.

5. An apparatus as set forth in claim 4 wherein said device deactuates said timer means at said overfill condition so that said timer means cannot advance said program member after a water overfill condition is sensed by said device.

6. An apparatus as set forth in claim 4 wherein said device holds said program member in its drain operating position and holds said timer means in its deactivated condition even after said water level has fallen below said overfill condition until said device is manually overridden.

7. An apparatus having means for directing water therein to fill the same to a desired level and having means for draining the apparatus of the water at a desired time, a pneumatic source, pneumatic actuators for respectively actuating said water directing means and said water draining means when said actuators receive a pneumatic signal from said source, a movable program member for sequentially interconnecting said source to said actuators, a timer means for moving said program member and a water level sensing device, said device when sensing a water overfill condition advancing said program member to a position to interconnect said source with one of said actuators to cause operation of said draining means to tend to remove the water from said apparatus.

8. An apparatus as set forth in claim 7 wherein said pneumatic source holds said device in its overfill position even though the water level has fallen below the overfill condition so that said draining means continues to operate.

9. An apparatus as set forth in claim 7 wherein a pneumatic actuator is provided to turn off said timer means and wherein said device interconnects said source to said actuator for said timer means when said overfill condition is sensed by said device.

10. An apparatus as set forth in claim 7 wherein said pneumatic source comprises a vacuum pump.

11. An apparatus as set forth in claim 7 wherein pneumatically operated actuator means is provided to advance said program member to said drain operating position thereof and wherein said device is effective to interconnect said source to said actuator means only when said device senses an overfill condition.

12. An apparatus as set forth in claim 7 wherein said device remains in its overfill position until said device is manually overridden.

References Cited

UNITED STATES PATENTS 3,112,630　12/1963　Anderson et al. ____ 137—387 X
3,124,145　 3/1964　Egle _____ 134—57

FOREIGN PATENTS 584,827　1/1947　Great Britain.

WILLIAM F. O'DEA, *Primary Examiner.*

D. R. MATTHEWS, *Assistant Examiner.*